United States Patent
Chiang

(10) Patent No.: US 8,089,748 B2
(45) Date of Patent: Jan. 3, 2012

(54) ELECTRONIC DEVICE AND METHOD FOR USING THE SAME

(75) Inventor: Meng-Sheng Chiang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 0 days.

(21) Appl. No.: 12/506,267

(22) Filed: Jul. 21, 2009

(65) Prior Publication Data
US 2010/0027204 A1 Feb. 4, 2010

(30) Foreign Application Priority Data

Jul. 30, 2008 (TW) .............................. 97128866 A

(51) Int. Cl.
*H05K 5/00* (2006.01)
*H05K 7/00* (2006.01)
*H04M 1/00* (2006.01)

(52) U.S. Cl. ......... 361/679.01; 361/679.02; 361/679.55; 361/679.56; 361/679.57; 361/679.58; 361/679.27; 455/575.1; 455/575.3; 455/575.4; 455/575.8

(58) Field of Classification Search ............. 361/679.01, 361/679.02, 679.08, 679.09, 679.3, 679.55–679.59; 248/917–924; 345/156, 157, 168, 169; 455/575.1
See application file for complete search history.

(56) References Cited

U.S. PATENT DOCUMENTS

| | | | |
|---|---|---|---|
| 7,127,277 | B2 | 10/2006 | Shiue et al. |
| 2005/0236869 | A1* | 10/2005 | Ka et al. .................. 296/192 |
| 2006/0046792 | A1 | 3/2006 | Hassemer et al. |
| 2007/0067954 | A1* | 3/2007 | Finney et al. .................. 16/235 |
| 2008/0232071 | A1 | 9/2008 | Schechtel et al. |
| 2008/0297995 | A1* | 12/2008 | Lai .............................. 361/680 |

FOREIGN PATENT DOCUMENTS

| | | |
|---|---|---|
| CN | 2419752 | 2/2001 |
| CN | 2788517 | 6/2006 |
| EP | 1510905 | 3/2005 |
| TW | 1252667 | 4/2006 |
| TW | 200612049 | 4/2006 |
| TW | 200722642 | 6/2007 |
| TW | 1293549 | 2/2008 |

OTHER PUBLICATIONS

"Search Report of European counterpart application", issued on Oct. 28, 2009, p.1-p.8. "First Office Action of European Counterpart Application", issued on Aug. 11, 2010, p.1-p.7, in which the listed EP reference was cited.
"First Office Action of China Counterpart Application", issued on Aug. 3, 2010, p.1-p.3, in which the listed CN references were cited.
"Office Action of Taiwan Counterpart Application", issued on Nov. 17, 2011, p. 1-p. 6., in which the listed references were cited.

* cited by examiner

Primary Examiner — Jayprakash N Gandhi
Assistant Examiner — Jerry Wu
(74) Attorney, Agent, or Firm — Jianq Chyun IP Office

(57) ABSTRACT

An electronic device and a method for using the same are provided. The electronic device includes a first body, a torsion hinge, and a second body. The first body has a first magnetic component. The torsion hinge is slidably disposed on the first body. The second body is connected to the torsion hinge and has a second magnetic component. The second magnetic component magnetically attracts the first magnetic component when the torsion hinge is located at a first position, and enables the first body and the second body to be in a folded state. The second magnetic component separates from the first magnetic component, and the torsion hinge drives the second body to rotate relative to the first body when the torsion hinge leaves the first position, so as to enable the first body and the second body to be in an unfolded state.

5 Claims, 7 Drawing Sheets

ELECTRONIC DEVICE AND METHOD FOR USING THE SAME

CROSS-REFERENCE TO RELATED APPLICATION

This application claims the priority benefit of Taiwan application serial No. 97128866, filed on Jul. 30, 2008. The entirety of the above-mentioned patent application is hereby incorporated by reference herein and made a part of this specification.

BACKGROUND OF THE INVENTION

1. Field of the Invention

The present application generally relates to an electronic device and a method for using the same, in particular, to an electronic device that is convenient for users to operate and a method for using the same.

2. Description of Related Art

With the development of the technology, people are becoming more and more dependent on electronic devices. In order to meet current requirements on the electronic devices in terms of high computing performance and light, thin, short, and small designs, various portable electronic devices, such as ultra mobile personal computer (UMPC), tablet PC, pocket PC, personal digital assistant (PDA), cell phone, and notebook PC, are developed.

FIG. 1 is a schematic view of a conventional cell phone. The cell phone is a clam shell type cell phone, so as to achieve easy operation and a light, thin, short, and small design. The cell phone 100 includes a first body 110, a second body 120, and a hinge 130. The first body 110 is rotatably connected to the second body 120 through the hinge 130, such that the cell phone 100 can be unfolded and folded. In order to maintain the cell phone 100 in an unfolded (or folded) state, the hinge 130 has a crown design (not shown) to fix the first body 110 and the second body 120 at positions corresponding to the unfolded (or folded) state.

However, when operating the cell phone, a user has to apply an additional force in order to unfold or fold the cell phone 100 due to the hinge design, which is a burden to the user.

SUMMARY OF THE INVENTION

Accordingly, the present application is directed to an electronic device, which is easy to unfold and fold.

The present application is also directed to a method for using an electronic device, which is quite convenient.

An electronic device including a first body, a torsion hinge, and a second body is provided. The first body has a first magnetic component. The torsion hinge is slidably disposed on the first body. The second body is connected to the torsion hinge and has a second magnetic component. The second magnetic component magnetically attracts the first magnetic component when the torsion hinge is located at a first position, and enables the second body to be stacked on the first body, so as to make the first body and the second body in a folded state. The second magnetic component separates from the first magnetic component, and the torsion hinge drives the second body to rotate relative to the first body when the torsion hinge leaves the first position, so as to enable the first body and the second body to be in an unfolded state.

A method for using the electronic device as described above is provided. The method includes: forcing the torsion hinge to leave the first position and drive the second body to rotate relative to the first body, when the electronic device is to be unfolded; and applying a force on the second body to enable the second body to rotate and attach to the first body, and enable the second magnetic component to magnetically attract the first magnetic component, when the electronic device is to be folded.

The present application provides an electronic device which is convenient for users to unfold and fold and a method for using the same. When the electronic device is to be unfolded, a force is applied to make the torsion hinge move so as to separate the magnetic components of the upper and lower bodies from each other, the bodies are enabled to rotate and thus unfolded by a torque of the torsion hinge. When the electronic device is to be folded, a force is applied to make the upper body rotate and attach to the lower body, and the electronic device is then folded by the magnetic attraction between the magnetic components of the upper and lower bodies. In other words, such an electronic device enables users to conveniently unfold and fold the upper and lower bodies.

In order to the make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
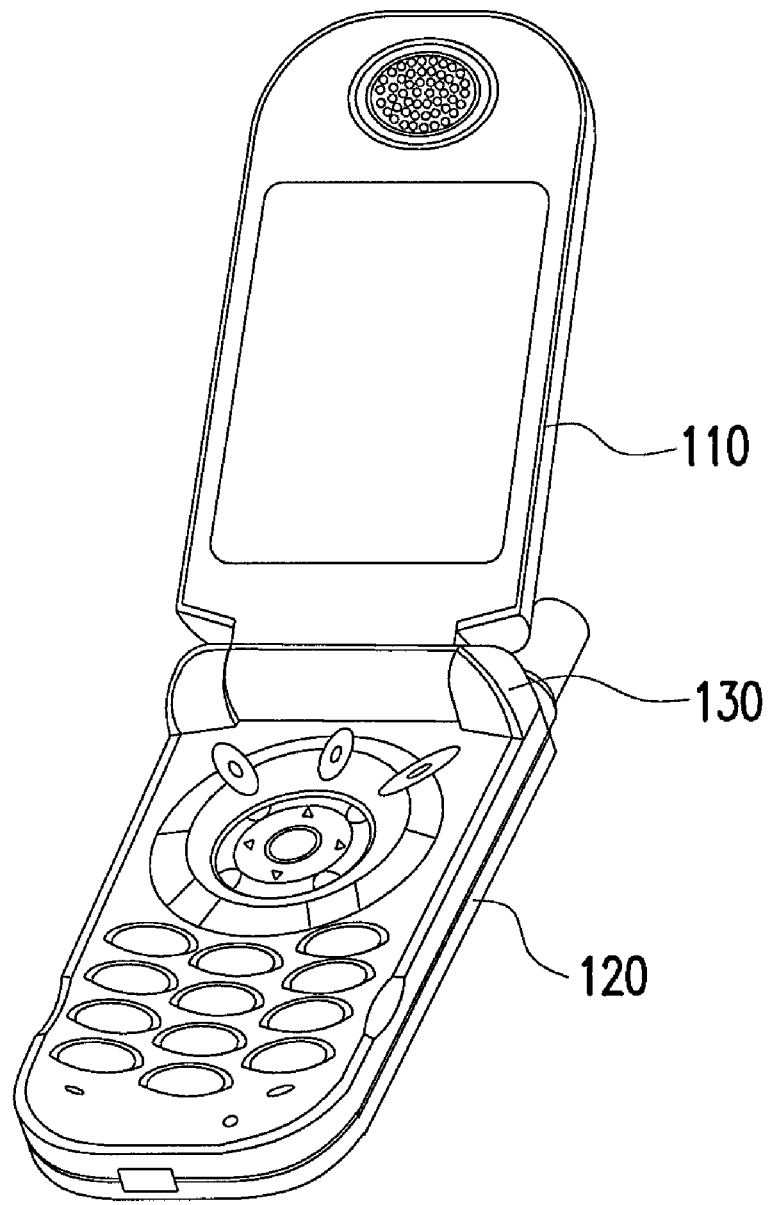
FIG. 1 is a schematic view of a conventional cell phone.

Reference will now be made in detail to the present embodiments of the invention, examples of which are illustrated in the accompanying drawings. Wherever possible, the same reference numbers are used in the drawings and the description to refer to the same or like parts.

Figure 2:
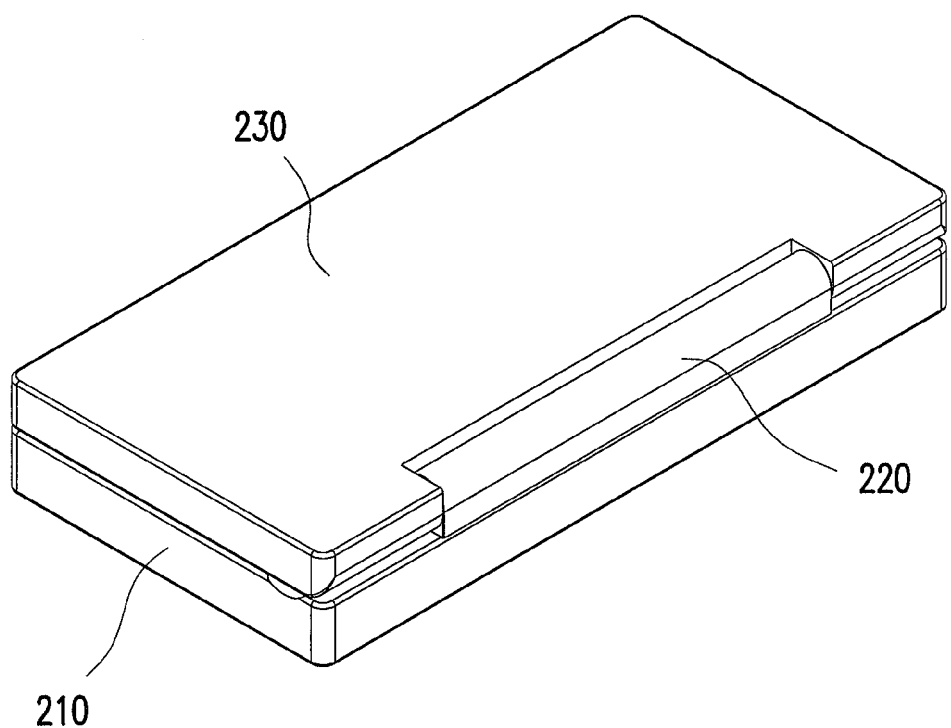
FIG. 2 is a schematic view of an electronic device according to an embodiment of the present invention.
Figure 3:
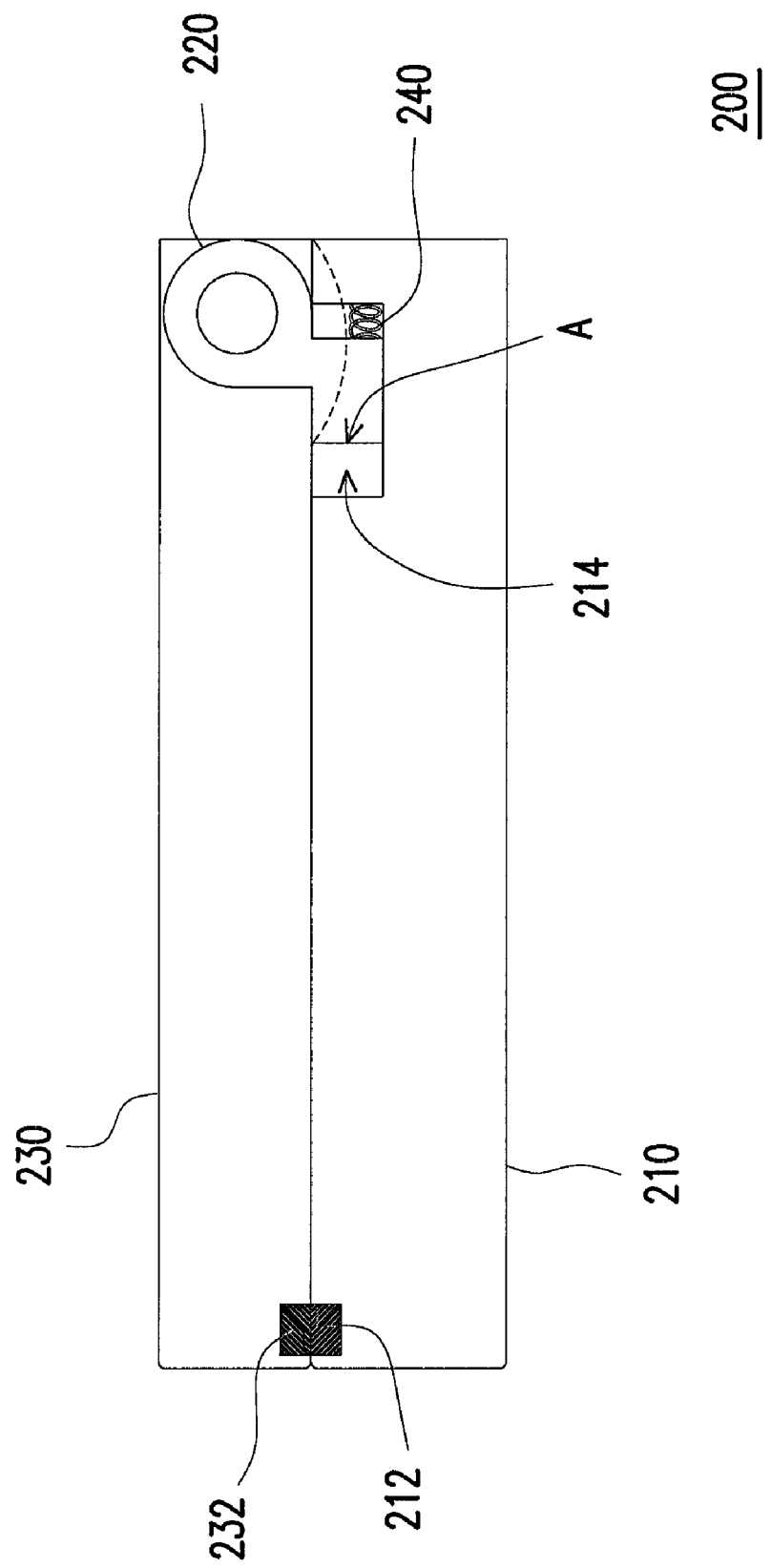
FIG. 3 is a side perspective view of the electronic device in FIG. 2.

FIG. 2 is a schematic view of an electronic device according to an embodiment of the present invention. FIG. 3 is a side perspective view of the electronic device in FIG. 2. Referring to FIGS. 2 and 3, an electronic device 200 includes a first body 210, a torsion hinge 220, and a second body 230. The first body 210 has a first magnetic component 212. The torsion hinge 220 is slidably disposed on the first body 210. The second body 230 is connected to the torsion hinge 220 and has a second magnetic component 232.

Figure 4:
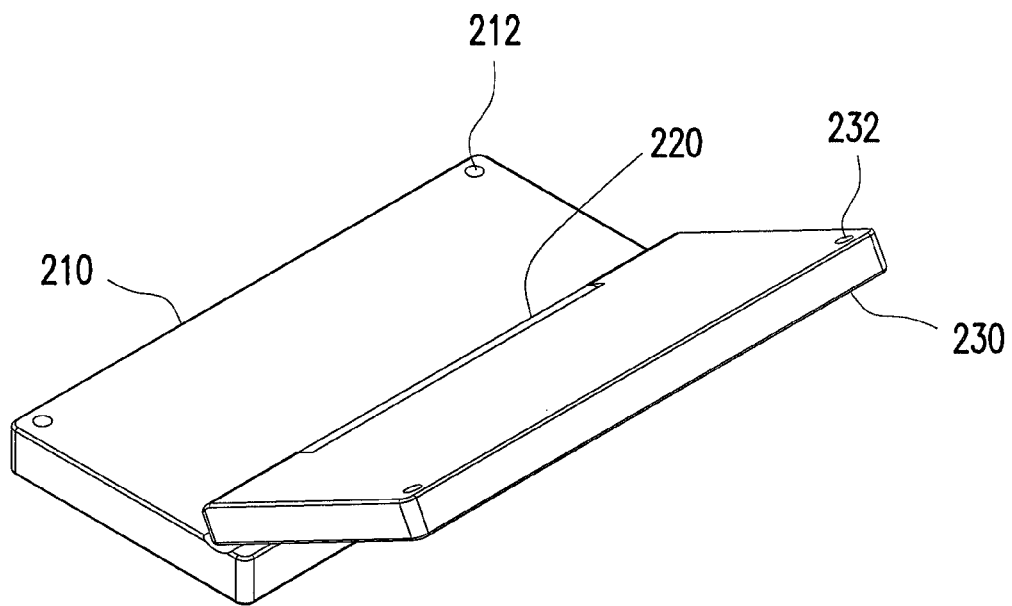
FIG. 4 is a schematic view of the electronic device in FIG. 2 after being unfolded.

FIG. 4 is a schematic view of the electronic device in FIG. 2 after being unfolded. Referring to FIG. 3, the second magnetic component 232 magnetically attracts the first magnetic component 212 when the torsion hinge 220 is located at a first position A, and enables the first body 210 and the second body 230 to be in a folded state. Referring to FIG. 4, the second magnetic component 232 separates from the first magnetic component 212, and the torsion hinge 220 drives the second body 230 to rotate relative to the first body 210 when the torsion hinge 220 leaves the first position A (as marked in FIG. 3), so as to enable the first body 210 and the second body 230 to be in an unfolded state.

Figure 5A:
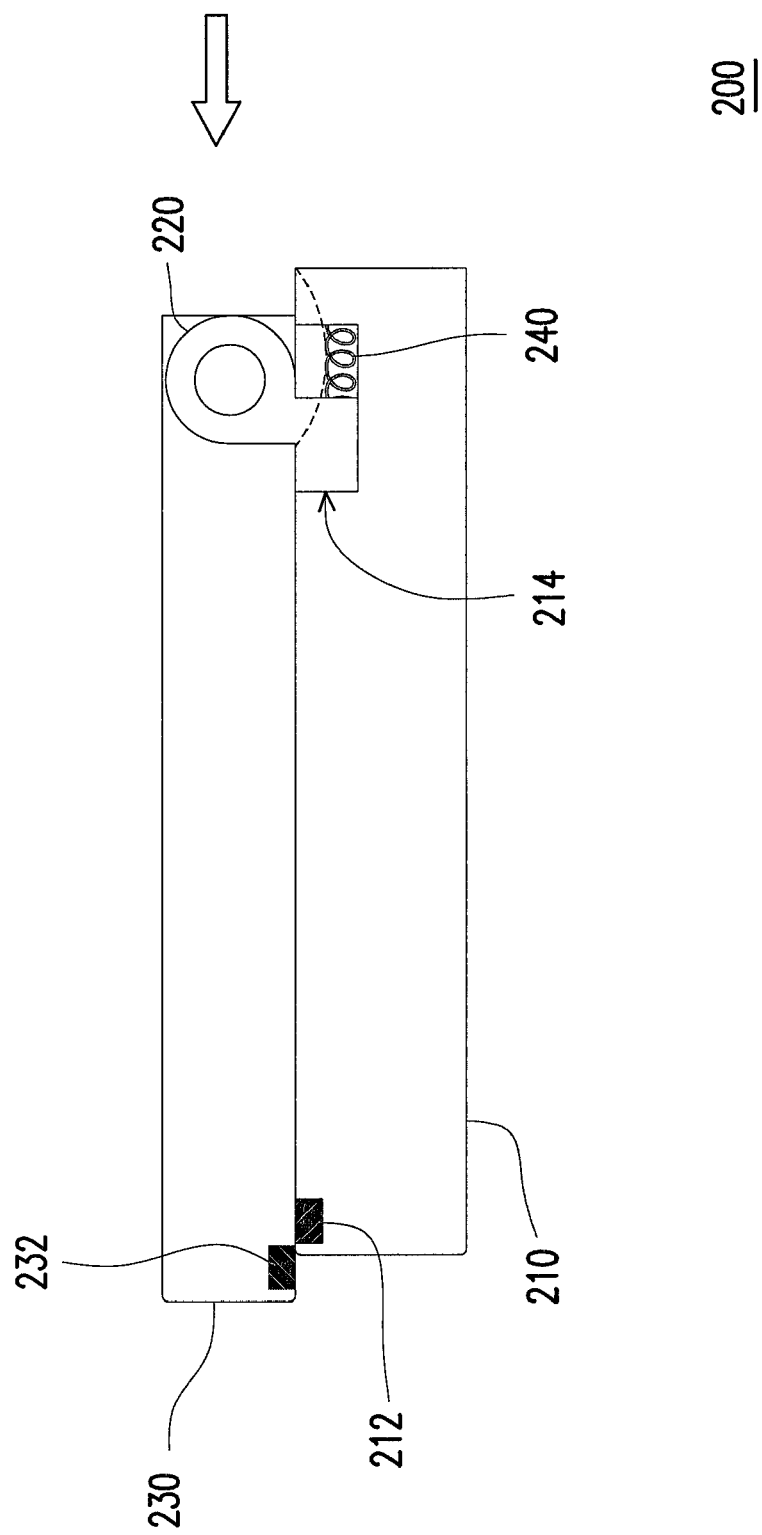
FIG. 5A is a side perspective view of the electronic device in FIG. 2 before being unfolded.
Figure 5B:
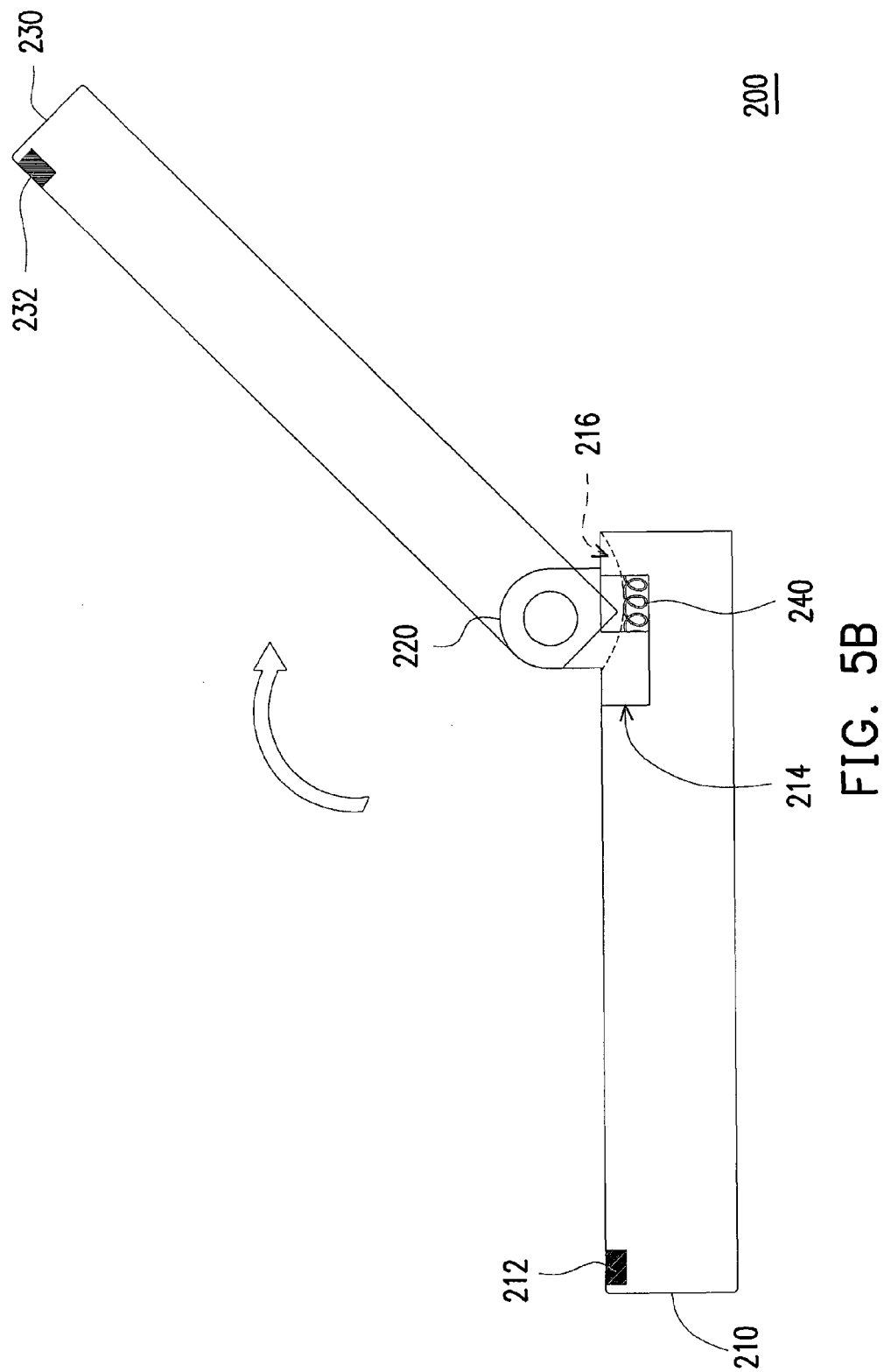
FIG. 5B is a side perspective view of the electronic device in FIG. 2 in an unfolded state.

A method for using the electronic device 200 is further provided. FIG. 5A is a side perspective view of the electronic device in FIG. 2 before being unfolded. FIG. 5B is a side perspective view of the electronic device in FIG. 2 in an unfolded state. Referring to FIG. 5A, firstly, when the electronic device 200 is to be unfolded, a force is applied on the second body 230 to enable the torsion hinge 220 and the second body 230 to slide relative to the first body 210 and leave the first position A (as marked in FIG. 3), and meanwhile drive the first magnetic component 212 to dislocate from the second magnetic component 232 so as to release the magnetic attraction between the first magnetic component 212 and the second magnetic component 232. Referring to FIG. 5B, the second body 230 is then driven by a torque of the torsion hinge 220 to rotate relative to the first body 210 and move away from the first body 210, so as to achieve the unfolded state.

Referring to FIG. 3, in this embodiment, the electronic device 200 further includes an elastic member 240 and an accommodating groove 214. The accommodating groove 214 is located at the first body 210, and the torsion hinge 220 is slidably disposed in the accommodating groove 214. The elastic member 240 is disposed in the accommodating groove 214, and connects the torsion hinge 220 and the first body 210. When the electronic device 200 is in the folded state, the first magnetic component 212 magnetically attracts the second magnetic component 232, and at this time, the torsion hinge 220 is located at the first position A, and the elastic member 240 is not stressed.

Figure 5C:
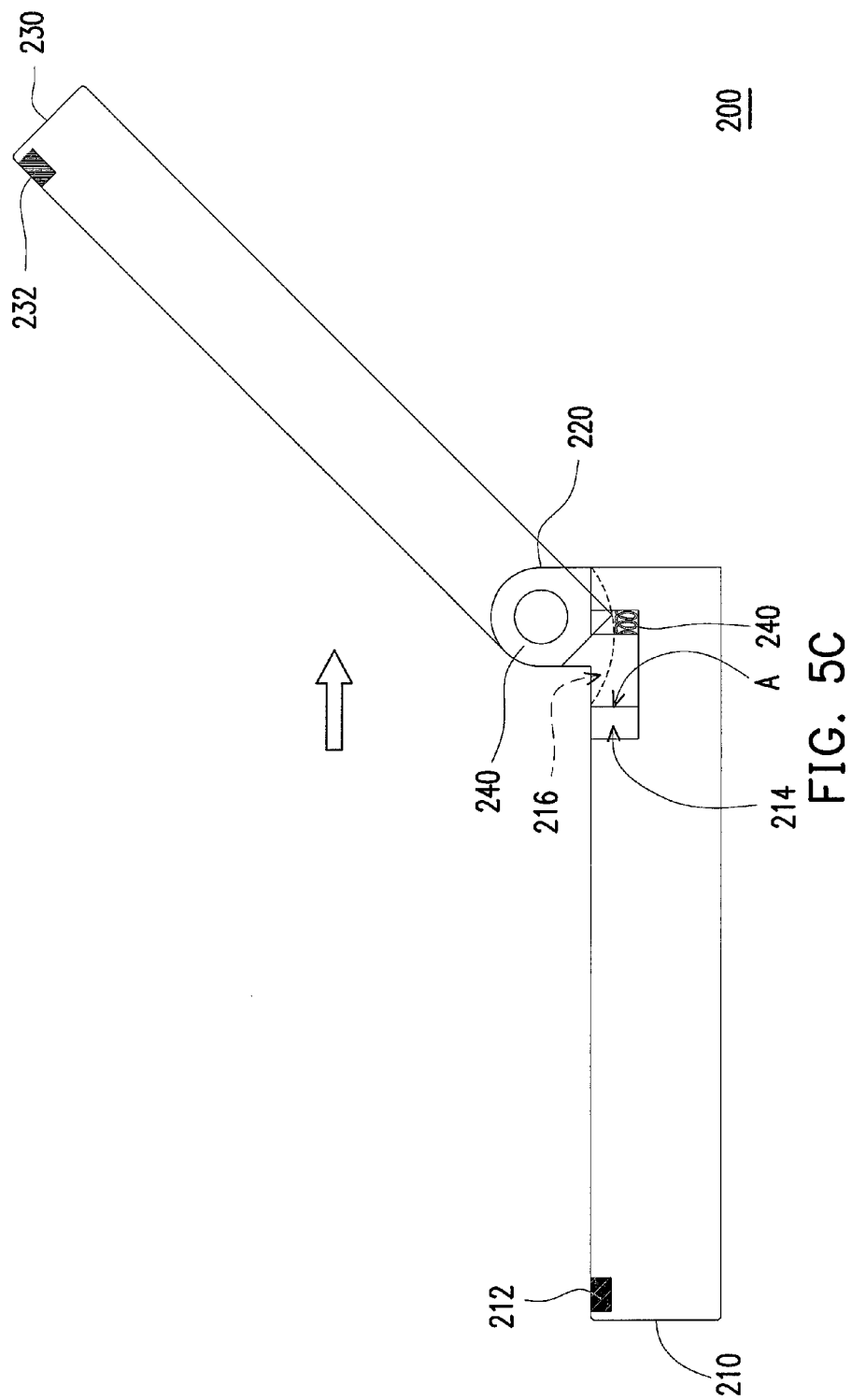
FIG. 5C is a side perspective view of the electronic device in FIG. 2 after being unfolded.

FIG. 5C is a side perspective view of the electronic device in FIG. 2 after being unfolded. Referring to FIG. 5C, when the torsion hinge 220 leaves the first position A, the torsion hinge 220 draws the elastic member 240 to make the elastic member 240 in a stressed state. When the torsion hinge 220 drives the second body 230 to rotate relative to the first body 210, and enables the first body 210 and the second body 230 to be in the unfolded state, the elastic member 240 is released from the stressed state, and the torsion hinge 220 returns to the first position A.

In contrast, when the electronic device 200 is to be folded, a force is applied on the second body 230 to enable the second body 230 to rotate relative to the first body 210 and attach to the first body 210. Then, the torsion hinge 220 returns to the first position A due to the magnetic attraction between the first magnetic component 212 and the second magnetic component 232 as well as the elastic force of the elastic member 240, thus achieving the folded state of the electronic device.

In addition, the first body 210 further has a recessed portion 216, which serves as a space for evading the second body 230 when the second body 230 is rotated, so as to avoid any interference between the first body 210 and the second body 230. However, when the second body 230 is designed in a round form, and does not interfere with the first body 210 when the second body 230 is rotated, the first body 210 may not need the recessed portion 216.

In this embodiment, the elastic member 240 may be a coil spring, and the form of the elastic member 240 is not limited in the present application.

To sum up, in the electronic device and the method for using the same provided by the present application, when a user intends to unfold the electronic device, the user may apply a force on the torsion hinge to make the torsion hinge and the upper body move at the same time, so that the upper body is enabled to rotate and thus rotated by the torsion hinge. In contrast, when the user applies a force on the upper body to enable the upper body to rotate and attach to the lower body, the electronic device is maintained in the folded state by the magnetic components disposed on the upper and lower bodies.

Therefore, the user may operate the electronic device with single hand, so as to conveniently unfold and fold the upper and lower bodies. Meanwhile, as the torsion hinge and the upper body move synchronously, a gap that may easily clamp the hand of the user is avoided. Thus, the electronic device of the present application is practical and convenient for the users.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
a first body, comprising a first magnetic component;
a torsion hinge, slidably disposed on the first body, wherein the torsion hinge slides in an elongated direction of the first body; and
a second body, connected to the torsion hinge and comprising a second magnetic component, wherein the second magnetic component magnetically attracts the first magnetic component when the torsion hinge is located at a first position, and enables the second body to be stacked on the first body, so as to make the first body and the second body in a folded state, and the second magnetic component separates from the first magnetic component, and the torsion hinge drives the second body to rotate relative to the first body when the torsion hinge leaves the first position, so as to enable the first body and the second body to be in an unfolded state, and a distance between the torsion hinge and the first magnetic component varies as the torsion hinge leaves the first position.

2. The electronic device according to claim 1, further comprising an elastic member, disposed between the torsion hinge and the first body, for maintaining the torsion hinge at the first position.

3. The electronic device according to claim 2, wherein the elastic member is a coil spring.

4. The electronic device according to claim 1, wherein the first body further comprises an accommodating groove, and the torsion hinge is slidably disposed in the accommodating groove.

5. A method for using the electronic device according to claim 1, comprising:
forcing the torsion hinge to leave the first position and drive the second body to rotate relative to the first body, when the electronic device is to be unfolded; and
applying a force on the second body to enable the second body to rotate and attach to the first body, and enable the second magnetic component to magnetically attract the first magnetic component, when the electronic device is to be folded.

* * * * *